United States Patent
Taya

(10) Patent No.: US 8,511,914 B2
(45) Date of Patent: Aug. 20, 2013

(54) METHOD FOR CONNECTING OPTICAL FIBERS AND CONNECTION STRUCTURE OF OPTICAL FIBERS

(75) Inventor: Hiroyuki Taya, Sakura (JP)

(73) Assignee: Fujikura Ltd., Tokyo (JP)

( * ) Notice: Subject to any disclaimer, the term of this patent is extended or adjusted under 35 U.S.C. 154(b) by 152 days.

(21) Appl. No.: 13/052,679

(22) Filed: Mar. 21, 2011

(65) Prior Publication Data

US 2011/0235982 A1     Sep. 29, 2011

(30) Foreign Application Priority Data

Mar. 26, 2010 (JP) ................................ 2010-071453

(51) Int. Cl.
   *G02B 6/255* (2006.01)
(52) U.S. Cl.
   USPC ........................................................... 385/98
(58) Field of Classification Search
   USPC .......... 65/403, 411, 435, 475, 477; 264/1.24, 264/1.26; 385/96–98
   See application file for complete search history.

(56) References Cited

U.S. PATENT DOCUMENTS

| | | | | |
|---|---|---|---|---|
| 4,818,062 A | * | 4/1989 | Scifres et al. | 385/43 |
| 4,950,318 A | * | 8/1990 | Dyott | 65/403 |
| 7,481,588 B2 | * | 1/2009 | Monte | 385/96 |
| 7,634,168 B2 | * | 12/2009 | Ramos | 385/147 |
| 8,282,291 B2 | * | 10/2012 | Zheng et al. | 385/97 |
| 2002/0094159 A1 | * | 7/2002 | Goldberg et al. | 385/27 |
| 2002/0172478 A1 | * | 11/2002 | Sahlin | 385/115 |
| 2003/0165292 A1 | * | 9/2003 | Bhagavatula et al. | 385/33 |
| 2007/0280597 A1 | * | 12/2007 | Nakai et al. | 385/43 |
| 2008/0219622 A1 | * | 9/2008 | Lewis | 385/43 |
| 2010/0176311 A1 | * | 7/2010 | Segi et al. | 250/494.1 |

FOREIGN PATENT DOCUMENTS

| | | |
|---|---|---|
| JP | 62-184403 A | 8/1987 |
| JP | 07-306333 A | 11/1995 |
| JP | 08-075926 A | 3/1996 |
| JP | 2003-229617 A | 8/2003 |
| JP | 2004-361846 A | 12/2004 |
| JP | 2005-129863 A | 5/2005 |
| JP | 2007-033859 A | 2/2007 |
| JP | 2009-514002 A | 4/2009 |

\* cited by examiner

*Primary Examiner* — Charlie Peng
(74) *Attorney, Agent, or Firm* — Westerman, Hattori, Daniels & Adrian, LLP

(57) ABSTRACT

A method for connecting optical fibers and a connection structure of optical fibers capable of suppressing axial misalignment between cores in end-to-end connection of optical fibers at least one of which has a clad for a non-circular shape. The method includes: a preparing step of preparing a pair of optical fibers 30, 50 including a first optical fiber 30 having a clad 32 of a non-circular shape and a second optical fiber 50 having a clad 52 of a circular shape; a forming step of forming the clad 32 of the first optical fiber 30 at and near one end 35 thereof to have a more circular shape from the non-circular shape; an aligning step of observing in side view the first and second optical fibers 30, 50 and aligning a core 31 of the first optical fiber 30 at and near the one end 35 thereof and a core 51 of the second optical fiber 50 at and near one end 55 thereof in a straight line; and a fusing step of butting the one end 35 of the first optical fiber 30 and the one end 55 of the second optical fiber 50 against each other and fusing the ends together.

7 Claims, 4 Drawing Sheets

METHOD FOR CONNECTING OPTICAL FIBERS AND CONNECTION STRUCTURE OF OPTICAL FIBERS

TECHNICAL FIELD

The invention relates to a method for connecting optical fibers and a connection structure of optical fibers.

BACKGROUND ART

Fiber laser devices can produce a small beam spot of light having high focusing performance and high power density, and process in a noncontact manner. Accordingly, fiber laser devices are used in various fields such as the laser processing field and the medical field. A fiber laser device includes an amplification optical fiber having a core coated with a clad and doped with an active element for amplifying light. However, it is known that skew mode propagation may occur in the amplification optical fiber, where part of pumping light propagates only through the clad without being absorbed by the active element and does not contribute to amplification of light. One known technique for preventing such skew mode propagation is to form the clad of the amplification optical fiber to have a cross-section of a non-circular shape such as a D-shape or a polygonal shape.

Patent Document 1 listed below discloses an amplification optical fiber in which a clad is formed to have a polygonal cross-section as mentioned above. According to Patent Document 1, in connecting the amplification optical fiber having a clad of a polygonal shape to another optical fiber, cores of both optical fibers to be connected are butted against each other under side view observation, where accurate positions of the cores may not be visually obtained depending on the shape of the clad of the amplification optical fiber. Patent Document 1 also states that accurate positions of the cores can be visually obtained by side view observation if the clad of the amplification optical fiber has a substantially square shape.

[Patent Document 1] Japanese Patent Application Laid-Open No. 2003-229617

SUMMARY OF THE INVENTION

However, even if the clad of the amplification optical fiber has a substantially square shape, there is a disadvantage that refraction of light passing from along side faces of the clad to the core changes when the amplification optical fiber is turned about the axis, which makes it difficult to obtain accurate positions of the cores by side view observation. Therefore, there is a disadvantage that axial misalignment between cores is likely to occur if optical fibers at least one of which has a clad of a non-circular shape are connected end-to-end to each other under side view observation.

Therefore, an object of the invention is to provide a method for connecting optical fibers and a connection structure of optical fibers capable of suppressing axial misalignment between cores in end-to-end connection of optical fibers at least one of which has a clad of a non-circular shape.

A method for connecting optical fibers according to the invention includes: a preparing step of preparing a pair of optical fibers including a first optical fiber having a clad of a non-circular shape and a second optical fiber having a clad of a circular shape; a forming step of forming the clad of the first optical fiber at and near one end thereof to have a more circular shape from the non-circular shape; an aligning step of observing in side view a formed portion of the clad of the first optical fiber and around one end of the second optical fiber and aligning a core of the first optical fiber at and near the one end thereof and a core of the second optical fiber at and near the one end thereof in a straight line; and a fusing step of butting the one end of the first optical fiber and the one end of the second optical fiber against each other and fusing the ends together.

According to such a method for connecting optical fibers, the clad is formed to have a more circular shape at and near the one end of the first optical fiber having the clad of a non-circular shape, and the pair of optical fibers is then aligned under side view observation. It is therefore possible to prevent a change in refraction of light passing from along side faces of the clad to the core even if the amplification optical fiber is turned about the axis during side view observation. As a result, axial misalignment between the cores can be suppressed in side view observation and the one end of the first optical fiber and the one end of the second optical fiber can be connected to each other in a state where axial misalignment is suppressed.

Alternatively, a method for connecting optical fibers according to the invention includes: a preparing step of preparing a pair of optical fibers each having a clad of a non-circular shape; a forming step of forming the clad of each of the optical fibers at and near one end thereof to have a more circular shape from the non-circular shape; an aligning step of observing in side view formed portions of the clads of the optical fibers and aligning a core of one optical fiber at and near the one end thereof and a core of another optical fiber near the one end thereof in a straight line; and a fusing step of butting the one ends of the optical fibers against each other and fusing the ends together.

According to such a method for connecting optical fibers, the respective clads are formed to have a more circular shape at and near the one ends of the pair of optical fibers each having the clad of a non-circular shape, and the pair of optical fibers is then aligned under side view observation. It is therefore possible to prevent a change in refraction of light passing from along side faces of the clads to the cores even if the optical fibers are turned about the axis during side view observation. As a result, axial misalignment between the cores can be suppressed in side view observation and the one ends of the respective optical fibers can be connected to each other in a state where axial misalignment is suppressed.

In the forming step of the method for connecting optical fibers described above, the clad is preferably formed for 100 μm or longer in a longitudinal direction of the optical fiber from the one end thereof.

Forming of the clad for 100 μm or longer in the longitudinal direction of the optical fiber from the one end thereof facilitates side view observation at a plurality of points in the aligning step.

In the method for connecting optical fibers described above, the forming in the forming step is preferably carried out by discharge heating.

Since a fusion splicer for connecting optical fibers can be generally used for discharge heating without any change, this can save the trouble of providing an additional device for the forming.

In the method for connecting optical fibers described above, the discharge heating is preferably carried out by intermittent discharge.

Such discharge heating carried out by intermittent discharge allows heat to be less likely to be conducted to the core and prevents temperature rise of the core. Thus, the clad can be formed while deformation of the core by heat is prevented. Therefore, a splice loss of light propagating through the core after the connection can be suppressed.

In the method for connecting optical fibers described above, a non-discharge time is preferably longer than a discharge time in the intermittent discharge.

Such intermittent discharge allows heat to be much less likely to be conducted to the core and prevents temperature rise of the core.

In the method for connecting optical fibers described above, the non-discharge time is more preferably four times or more longer than the discharge time.

Such intermittent discharge allows heat to be still less likely to be conducted to the core and prevents temperature rise of the core.

A connection structure of optical fibers according to the invention is a connection structure of a pair of optical fibers that are connected end-to-end, wherein a clad of at least one optical fiber has a non-circular shape, and in the optical fiber having the clad of a non-circular shape, the clad is formed to have a more circular shape at and near a splice than at another portion thereof.

According to such a connection structure of optical fibers, axial misalignment between the cores at the splice can be suppressed and a splice loss of light propagating through the core can be suppressed. It is generally known that a portion connected by heating is more fragile than the other portion since the glass strength is decreased by thermal strain applied to the glass. If an optical fiber in which a clad is not subjected to forming and the clad has a non-circular shape is used, a stress applied to or near a splice is not distributed uniformly at the outer periphery of the clad at and near the splice but causes stress concentration at a portion thereof. Optical fibers are easily broken at the portion. In contrast, according to the connection structure of optical fibers according to the invention, the clad at and near the splice is formed to have a more circular shape. Accordingly, a stress applied to or near the splice can be distributed substantially uniformly over the entire outer periphery and breaking can be suppressed as compared to the case where a clad at and near a splice is not subjected to forming. For example, in a case where a clad has a polygonal shape, a stress applied to a splice causes stress concentration at a cornered portion of an outer circumferential face at and near the splice and a fracture of the fiber is likely to occur at the cornered portion. In contrast, according to the connection structure of optical fibers of the invention, the clad is formed to have a more circular shape at and near the splice, whereby corner portions of the outer circumferential face of the clad are eliminated. As a result, even if a stress is applied to the splice, the stress can be distributed substantially uniformly over the entire outer periphery and breaking can be suppressed as compared to the case where a clad at a splice is not subjected to forming.

In the connection structure of optical fibers described above, in the optical fiber having the clad of a non-circular shape, the clad is formed preferably for 100 µm or longer in a longitudinal direction from the splice.

With such a connection structure of optical fibers, a splice loss of light caused by axial misalignment between cores can be suppressed. Moreover, a zone where the thermal strain described above occurs significantly is a zone which heat caused by electric discharge reaches and is at most within 100 µm from the connecting point in a typical fusion splicer. Therefore, since cornered portions of a polygonal shape or other non-circular shapes are eliminated within 100 µm from the connecting point by forming for a length of 100 µm or longer, there is no portion where the stress concentrates at the connecting point, and it is thus possible to suppress breaking at the connecting point.

As described above, a method for connecting optical fibers and a connection structure of optical fibers capable of preventing axial misalignment between cores are provided according to the invention.

BEST MODE FOR CARRYING OUT THE INVENTION

Figure 1:
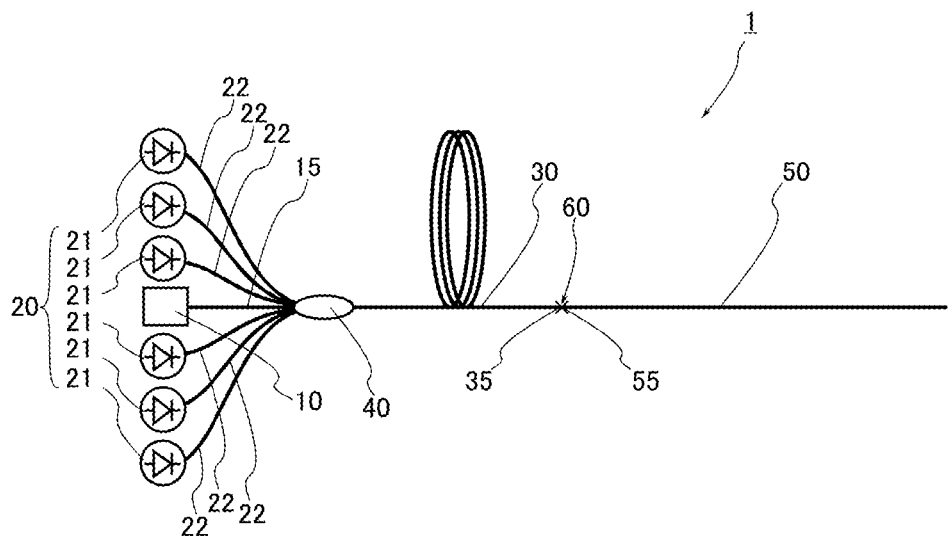
FIG. 1 is a diagram showing a fiber laser device having a connection structure of optical fibers according to an embodiment of the invention.

A preferred embodiment of a method for connecting optical fibers and a connection structure of optical fibers according to the invention will be described hereinafter referring to the drawings.

FIG. 1 is a diagram showing a fiber laser device having a connection structure of optical fibers according to an embodiment of the invention. As shown in FIG. 1, a laser device 1 is a fiber laser device including, as main components: a seed light source 10 configured to output seed light; a pumping light source 20 configured to output pumping light; an amplification optical fiber (first optical fiber) 30 to which the seed light and the pumping light are input; a combiner 40 configured to connect the seed light source 10 and the pumping light source 20 to the amplification optical fiber 30; and a delivery fiber (second optical fiber) 50 one end of which is connected to the amplification optical fiber 30.

The seed light source 10 may be constituted by a laser light source including a laser diode or by a fiber laser device of fabry-perot type or fibering type, for example. The seed light output from the seed light source 10 may be laser light having a wavelength of 1070 nm, for example, but is not particularly limited thereto. The seed light source 10 is connected to a fiber 15 for propagation of seed light having a core and a clad coating the core. Seed light output from the seed light source 10 propagates through the core of the fiber 15 for propagation of seed light. The fiber 15 for propagation of seed light may be a single-mode fiber, for example, in which case the seed light propagates as single-mode light through the fiber 15 for propagation of seed light.

The pumping light source 20 is constituted by a plurality of laser diodes 21, and configured to output pumping light having a wavelength of 915 nm, for example, when the seed light has a wavelength of 1070 nm as described above. The laser diodes 21 of the pumping light source 20 are connected to fibers 22 for propagation of pumping light, respectively. Pumping light output from each laser diode 21 propagates through the corresponding fiber 22 for propagation of pumping light. The fiber 22 for propagation of pumping light may be a multi-mode fiber, for example, in which case the pumping light propagates as multi-mode light through the fiber 22 for propagation of pumping light.

Figure 2:
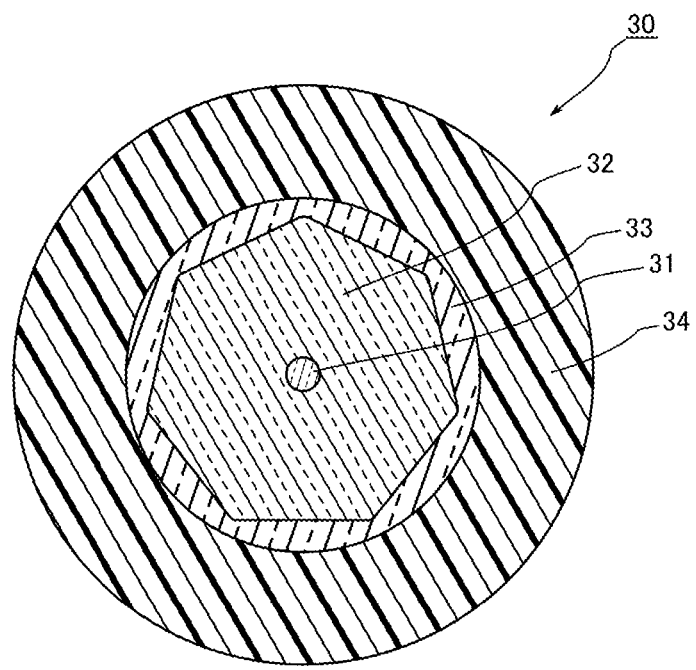
FIG. 2 is a view showing a structure of a cross-section perpendicular to a longitudinal direction of an amplification optical fiber shown in FIG. 1.

FIG. 2 is a view showing a structure of a cross-section perpendicular to the longitudinal direction of the amplification optical fiber 30. As shown in FIG. 2, the amplification optical fiber 30 has a core 31, a clad 32 coating the core 31, a plastic clad 33 coating the clad 32, and a coating layer 34 coating the plastic clad 33. The core 31 has a circular shape and the clad 32 has a non-circular shape in a cross-section of the amplification optical fiber 30. In addition, the plastic clad 33 and the coating layer 34 have circular shapes. In this embodiment, the clad 32 has a septagonal cross-sectional shape.

The clad 32 has a lower refractive index than the core 31, and the plastic clad 33 has a further lower refractive index than the clad 32. A material for the core 31 may be silica doped with an element such as germanium that increases the refractive index and an active element such as ytterbium (Yb) that is pumped by pumping light output from the pumping light source 20, for example. Such an active element may be a rare earth element, examples of which include thulium (Tm), cerium (Ce), neodymium (Nd), europium (Eu) and erbium (Er) in addition to Yb. Examples of the active element also include bismuth (Bi) or the like in addition to the rare earth element. A material for the clad 32 may be pure silica without any dopant, for example. A material for the plastic clad 33 may be UV curable resin, for example, and a material for the coating layer 34 may be UV curable resin different from that for the plastic clad 33, for example.

The combiner 40 connects the fiber 15 for propagation of seed light and the respective fibers 22 for propagation of pumping light to the amplification optical fiber 30. Specifically, the core of the fiber 15 for propagation of seed light is connected end-to-end to the core 31 of the amplification optical fiber 30 in the combiner 40. Further, cores of the respective fibers 22 for propagation of pumping light are connected end-to-end to the clad 32 in the combiner 40. Accordingly, seed light output from the seed light source 10 is input to the core 31 of the amplification optical fiber 30, and pumping light output from the pumping light source 20 is input to the clad 32 of the amplification optical fiber 30.

Figure 3:
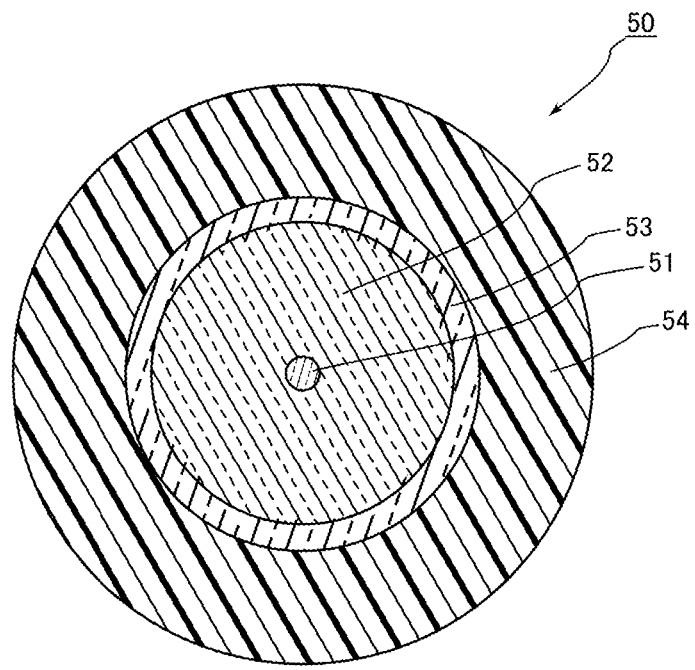
FIG. 3 is a view showing a structure of a cross-section perpendicular to a longitudinal direction of a delivery fiber shown in FIG. 1.

FIG. 3 is a view showing a structure of a cross-section perpendicular to the longitudinal direction of the delivery fiber 50 shown in FIG. 1. As shown in FIG. 3, the delivery fiber 50 has a core 51, a clad 52 coating the core 51, a plastic clad 53 coating the clad 52, and a coating layer 54 coating the plastic clad 53. All of the core 51, the clad 52, the plastic clad 53 and the coating layer 54 have circular shapes in a cross-section of the delivery fiber 50.

The clad 52 has a lower refractive index than the core 51, and the plastic clad 53 has a further lower refractive index than the clad 52. A material for the core 51 may be silica doped with an element such as germanium that increases the refractive index, for example, and a material for the clad 52 may be pure silica without any dopant, for example. A material for the plastic clad 53 may be UV curable resin, for example, and a material for the coating layer 54 may be UV curable resin different from that for the plastic clad 53, for example.

Figure 4:
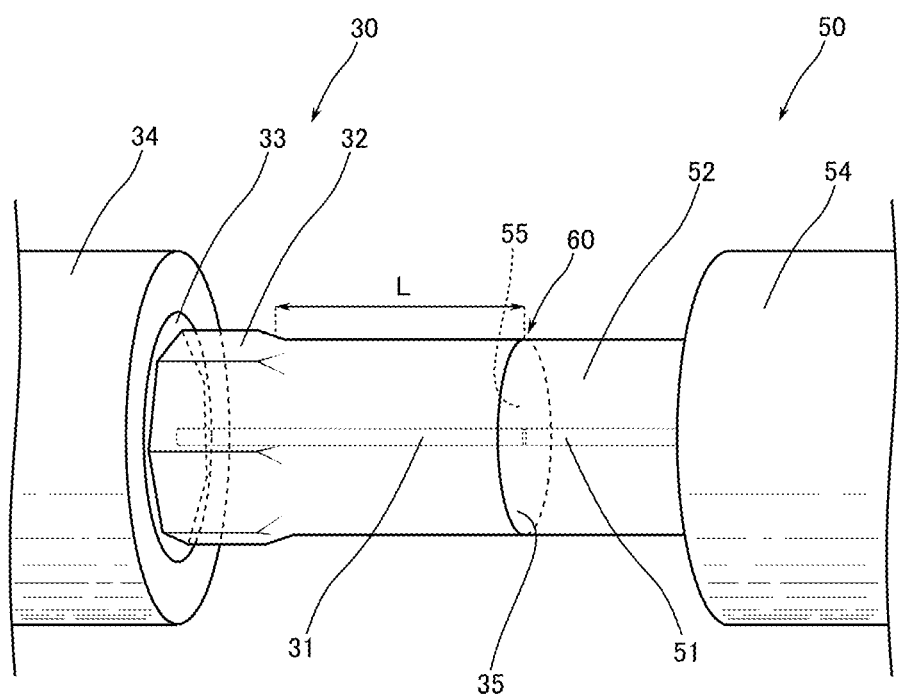
FIG. 4 is a view showing a connection between the amplification optical fiber and the delivery fiber shown in FIG. 1.

FIG. 4 is a view showing the connection between the amplification optical fiber 30 and the delivery fiber 50 shown in FIG. 1. As shown in FIG. 4, one end 35 of the amplification optical fiber 30 and one end 55 of the delivery fiber 50 are connected end-to-end at a splice 60. Specifically, the plastic clad 33 and the coating layer 34 of the amplification optical fiber 30 are stripped off for a predetermined length from the end 35. The clad 32 at and near the end 35 of the amplification optical fiber 30 is formed to have a substantially circular cross-sectional shape in a cross-section perpendicular to the longitudinal direction of the amplification optical fiber 30 for a length L from the end 35. The plastic clad 53 and the coating layer 54 of the delivery fiber 50 are also stripped off for a predetermined length from the end 55. The end 35 of the amplification optical fiber 30 and the end 55 of the delivery fiber 50 are connected end-to-end in a state where the core 31 at and near the end 35 of the amplification optical fiber 30 and the core 51 at and near the end 55 of the delivery fiber 50 are aligned with each other in a straight line.

The length L for which the clad 32 of the amplification optical fiber 30 is formed to have a substantially circular shape is preferably 100 μm or longer in terms of preventing axial misalignment between the core 31 and the core 51.

Next, a method for connecting the amplification optical fiber 30 and the delivery fiber 50 shown in FIG. 4 will be described.

Figure 5:
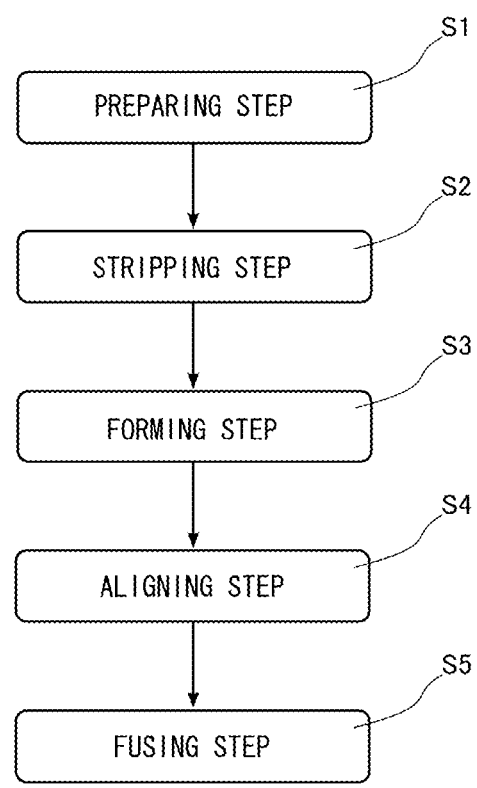
FIG. 5 is a flowchart showing steps of a method for connecting the amplification optical fiber and the delivery fiber shown in FIG. 4.

FIG. 5 is a flowchart showing steps of the method for connecting the amplification optical fiber 30 and the delivery fiber 50 shown in FIG. 4. As shown in FIG. 5, the method for connecting the amplification optical fiber 30 and the delivery fiber 50 includes: a preparing step S1 of preparing the amplification optical fiber 30 and the delivery fiber 50; a stripping step S2 of stripping the plastic clads 33 and 53 and the coating layers 34 and 54 for a predetermined length from the end 35 of the amplification optical fiber 30 and for a predetermined length from the end 55 of the delivery fiber 50, respectively; a forming step S3 of forming the clad 32 at and near the end 35 of the amplification optical fiber 30 to have a more circular shape; an aligning step S4 of aligning the core 31 at and near the end 35 of the amplification optical fiber 30 and the core 51 at and near the end 55 of the delivery fiber 50 with each other in a straight line under side view observation; and a fusing step S5 of butting the end 35 of the amplification optical fiber 30 and the end 55 of the delivery fiber 50 against each other and fusing the ends together.

(Preparing Step S1)

First, the amplification optical fiber 30 and the delivery fiber 50 are prepared. Thus, a pair of a first optical fiber having a clad with a non-circular shape and a second optical fiber having a clad with a circular shape is prepared.

(Stripping Step S2)

Figure 6:
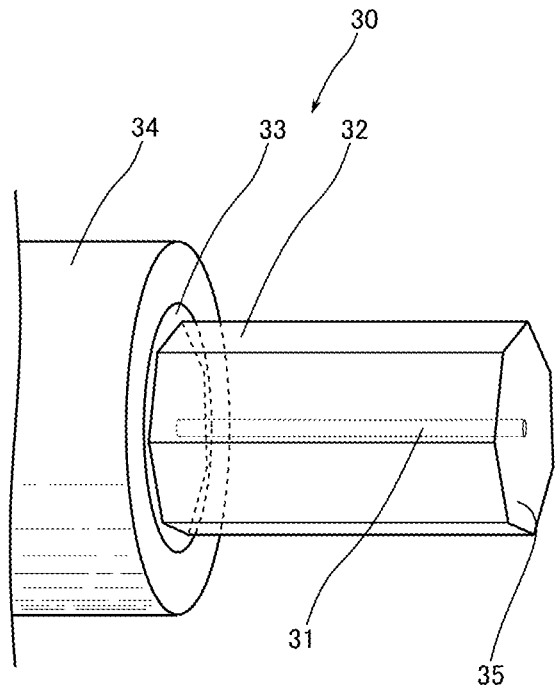
FIG. 6 is a view showing the amplification optical fiber after a stripping step.

Next, the plastic clad 33 and the coating layer 34 of the prepared amplification optical fiber 30 are stripped off for a predetermined length from the end 35 to expose the clad 32. In this step, the plastic clad 33 and the coating layer 34 are stripped off so that the clad 32 is exposed for a length longer than the length L for which the shape of the clad 32 is to be formed as shown in FIG. 4. As a result, the clad 32 of the amplification optical fiber 30 is exposed for the predetermined length form the end 35 as shown in FIG. 6. Similarly, the plastic clad 53 and the coating layer 54 of the delivery fiber 50 are stripped off for a predetermined length from the end 55 to expose the clad 52.

(Forming Step S3)

Next, the clad 32 at and near the end 35 of the amplification optical fiber 30 is formed to have a more circular cross-sectional shape in a cross-section perpendicular to the longitudinal direction of the amplification optical fiber 30. In this embodiment, the clad 32 is formed to have a substantially circular shape. The forming can be carried out by hot forming using electric discharge, a flame burner, a laser or the like, etching using chemicals, mechanical forming by polishing, or the like.

In hot forming, the clad 32 is formed to have a more circular cross-sectional shape by the action of surface tension of the clad 32 melted by heating. In hot forming using discharge heating, heating by intermittent discharge is preferable. With the intermittent discharge, heat is less likely to be conducted to the core 31 of the amplification optical fiber 30, and the clad 32 can thus be formed while preventing the core 31 from being deformed by heat. Therefore, a splice loss of light propagating through the core 31 after connection can be suppressed. More preferably, in forming the clad 32 by intermittent discharge heating, the non-discharge time is longer than the discharge time so that heat is much less likely to be conducted to the core. Still more preferably, the non-discharge time during the intermittent discharge is four times or more longer than the discharge time so that heat is still less likely to be conducted to the core. In hot forming using a flame burner, an oxyhydrogen burner may be used, for example. In hot forming using a laser, a $CO_2$ laser may be used, for example.

In etching or mechanical forming, the clad 32 is formed to have a more circular cross-sectional shape by etching or polishing corners in the cross-sectional shape of the clad 32. In etching using chemicals, hydrofluoric acid (HF) may be used for etching, for example. In mechanical forming, a glass abrasive may be used for polishing, for example.

Figure 7:
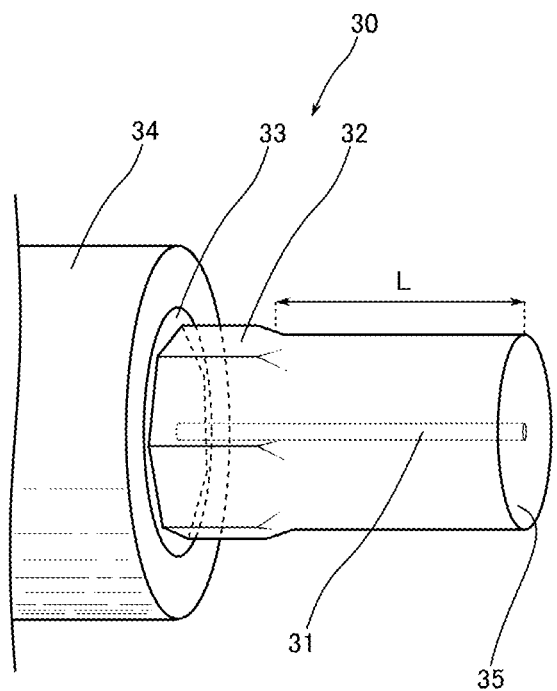
FIG. 7 is a view showing the amplification optical fiber after a forming step.

In this manner, the clad 32 of the amplification optical fiber 30 becomes in a state formed to have a substantially circular cross-sectional shape at and near the end 35 as shown in FIG. 7.

The length L for which the cross-sectional shape of the clad 32 is formed is preferably 100 μm or longer from the end 35 of the amplification optical fiber 30. Such a length allows easier alignment of the core 31 of the amplification optical fiber 30 and the core 51 of the delivery fiber 50 with each other in a straight line in the aligning step S4.

(Aligning Step S4)

Next, the end 35 of the amplification optical fiber 30 and the end 55 of the delivery fiber 50 are arranged to face each other, and the core 31 at and near the end 35 of the amplification optical fiber 30 and the core 51 at and near the end 55 of the delivery fiber 50 are aligned with each other in a straight line. In this step, the core 31 of the amplification optical fiber 30 and the core 51 of the delivery fiber 50 are aligned with each other under side view observation. In the side view observation of the amplification optical fiber 30, a portion where the clad 32 is formed is observed. The side view observation is preferably conducted at a plurality of points. In this case, the length L for which the cross-sectional shape of the clad 32 is formed is preferably 100 μm or longer from the end 35 of the amplification optical fiber 30, which allows easier observation at a plurality of points and easier alignment of the core 31 of the amplification optical fiber 30 and the core 51 of the delivery fiber 50 with each other in a straight line as described above.

(Fusing Step S5)

Next, as described above, the end 35 of the amplification optical fiber 30 and the end 55 of the delivery fiber 50 are butted against each other and fused together to be connected end-to-end. The fusing may be fusing by means of electric discharge, fusing a flame burner, fusing a laser, or the like. Fusing by discharge heating may be carried out by continuous discharge or intermittent discharge. In fusing a flame burner, an oxyhydrogen burner may be used, for example. In hot forming using a laser, a $CO_2$ laser may be used, for example. The end 35 of the amplification optical fiber 30 and the end 55 of the delivery fiber 50 are thus connected end-to-end, whereby the amplification optical fiber 30 and the delivery fiber 50 are connected as shown in FIG. 4.

According to the method for connecting optical fibers of this embodiment as described above, the clad 32 having a non-circular shape is formed to have a more circular shape at and near the end 35 of the amplification optical fiber 30, and the amplification optical fiber 30 and the delivery fiber 50 are then aligned with each other under side view observation. Therefore, even if the amplification optical fiber 30 turns about the axis during side view observation, change in refraction of light passing from along side faces of the clad 32 to the core can be prevented. Therefore, axial misalignment between the core 31 and the core 51 can be prevented under side view observation, and the end 35 of the amplification optical fiber 30 and the end 55 of the delivery fiber 50 can be connected in a state where axial misalignment is suppressed.

According to the connection structure of optical fibers of this embodiment, axial misalignment between the core 31 and the core 51 at the splice therebetween can be prevented. Therefore, a splice loss of light propagating through the core 31 to the core 51 can be prevented. In addition, since the clad 32 at the splice is formed to have a more circular shape, a stress applied to the splice, if any, can be distributed, and the amplification optical fiber 30 and the delivery fiber 50 can be prevented from breaking at the splice.

Although the invention has been described above by reference to a certain embodiment as an example, the invention is not limited thereto.

For example, the clad 32 is formed to have a substantially circular cross-sectional shape at and near the end 35 of the amplification optical fiber 30 that is the first optical fiber in the embodiment, but the invention is not limited thereto as long as the clad 32 is formed to have a more circular cross-sectional shape. Also in this case, axial misalignment between the core 31 of the amplification optical fiber 30 and the core 51 of the delivery fiber 50 can be better prevented in the aligning step S4 as compared to a case where the clad 32 is not subjected to forming.

In the embodiment described above, the clad 32 has a septagonal shape in a cross-section perpendicular to the longitudinal direction of the amplification optical fiber 30. However, the shape of the clad 32 may be any of other polygonal shapes, or a non-circular shape such as a D-shape or an elliptical shape.

In the embodiment, the clad 32 of the amplification optical fiber 30 that is the first optical fiber has a non-circular shape and the clad 52 of the delivery fiber 50 that is the second optical fiber has a circular shape. However, the invention is not limited thereto, and may be applied to a connection structure and a method for connecting a pair of optical fibers having clads of non-circular shapes in which a clad 52 of a delivery fiber 50 also has a non-circular shape. In this case, an amplification optical fiber 30 that is the first optical fiber (one optical fiber) and a delivery fiber 50 that is the second optical fiber (another optical fiber) each having a clad with a non-circular shape are prepared in the preparing step S1. Next, plastic clads 33 and 53 and coating layers 34 and 54 are stripped off for a predetermined length from one end 35 of the amplification optical fiber 30 and from one end 55 of the delivery fiber 50 in the stripping step S2. Then, the clad 32 of the amplification optical fiber 30 is formed in the same manner as in the embodiment, and the clad 52 is formed to have a more circular shape at and near the end 55 of the delivery fiber 50 in the forming step S3. The forming of the clad 52 may be in the same manner as the forming of the clad 32 at and near the end 35 of the amplification optical fiber 30. The amplification optical fiber 30 is observed in the same manner as in the embodiment, and the delivery fiber 50 is under side view observation at a portion of the clad 52 formed in the aligning step S4. Therefore, also in the delivery fiber 50, the length for which the cross-sectional shape of the clad 52 is formed is preferably 100 μm or longer from the end 55 of the delivery fiber 50, which allows easier observation at a plurality of points and easier alignment of the core 31 of the amplification optical fiber 30 and the core 51 of the delivery fiber 50 with each other in a straight line. Next, the fusing step S5 is carried out in the same manner as the embodiment.

Moreover, for example, the connection structure and the method for connecting the amplification optical fiber 30 that is the first optical fiber and the delivery fiber 50 that is the second optical fiber have been described in the embodiment. However, the invention is not limited thereto, and may be applied to a connection structure and a method for connecting other types of optical fibers used as the first optical fiber and the second optical fiber to each other.

If the plastic clad and the coating layer at and near one end of the prepared optical fiber are already stripped off in the preparing step S1, the stripping step S2 is not needed.

EXAMPLES

The invention will be more specifically explained below with examples and a comparative example, but the invention is not limited thereto.

Example 1

A double-clad fiber having a core, a clad coating the core, a plastic clad coating the clad and a coating layer coating the plastic clad, and a single-mode fiber having a core, a clad coating the core and a coating layer coating the clad were prepared. In the double-clad fiber, the core had a diameter of 7 μm and the clad had a septagonal shape in a cross-section perpendicular to the longitudinal direction of the fiber with an average outer diameter of 120 μm. In the single-mode fiber, on the other hand, the core had a diameter of 8 μm and the clad had a circular shape in a cross-section perpendicular to the longitudinal direction of the fiber with an outer diameter of 125 μm.

Next, the plastic clad and the coating layer of the double-clad fiber was stripped off for 10 mm from one end thereof. In addition, the coating layer of the single-mode fiber was stripped off for 10 mm from one end thereof.

Next, the double-clad fiber and the single-mode fiber were arranged in a fusion splicer. As the fusion splicer, FSM-40F manufactured by Fujikura Ltd. was used.

Next, discharge heating was applied to one end of the double-clad fiber at a discharge current of 12 mA for a discharge time of 50 μs. Then, discharge was temporarily stopped, the double-clad fiber was moved 100 μm relative to discharge electrodes, and discharge heating was applied again to an inner portion at 100 μm in the longitudinal direction from the end of the double-clad fiber at equal power and for equal discharge time. The clad of the double-clad fiber was formed in this manner to have a more circular shape than the septagonal shape for 100 μm from the end.

Next, the formed portion of the clad of the double-clad fiber and the formed portion of the single-mode fiber where the coating layer was stripped off were aligned with each other under side view observation. Then, the end of the double-clad fiber and the end of the single-mode fiber were butted against each other and fused together.

Examples 2 to 5

Next, the double-clad fiber and the single-mode fiber were connected in the same manner as Example 1 except that the discharge time of discharge heating applied to the end of the double-clad fiber and discharge heating applied to the inner portion at 100 μm in the longitudinal direction from the end thereof was as shown in Table 1.

Comparative Example 1

The double-clad fiber and the single-mode fiber were connected in the same manner as Example 1 except that the double-clad fiber was not subjected to forming by discharge heating.

Next, signal light was caused to propagate through the core of the double-clad fiber to the core of the single-mode fiber of each of Examples 1 to 5 and Comparative Example 1. The wavelength of the signal light was 1070 μm. The resulting splice loss of the signal light at the splice of the double-clad fiber and the single-mode fiber was as values shown in Table 1.

TABLE 1

|  | Discharge time (μs) | Splice loss (dB) |
| --- | --- | --- |
| Example 1 | 50 | 2.82 |
| Example 2 | 100 | 0.82 |
| Example 3 | 200 | 0.32 |
| Example 4 | 300 | 0.50 |
| Example 5 | 400 | 1.56 |
| Comparative Example 1 | 0 | 3.52 |

As shown in Table 1, the result shows that the splice loss was less in Examples 1 to 5 as compared to Comparative Example 1. This can be attributed to the fact that axial misalignment between the cores of the double-clad fiber and the single-mode fiber was prevented in alignment of the double-clad fiber and the single-mode fiber as a result of forming the clad of the double-clad fiber to have a more circular shape and the double-clad fiber and the single-mode fiber were connected in a state where axial misalignment was thus suppressed. In Examples 2, 3 and 4, the splice loss was less than 1 dB, which can be attributed to the fact that the clad was formed to have a more circular shape. Therefore, it was found that a discharge time of 100 to 300 μs is more preferable for an optical fiber in which a clad has a septagonal shape with an average outer diameter of 120 μm.

Examples 6 to 10

The double-clad fiber and the single-mode fiber were connected to each other in the same manner as Example 1 except that electric discharge applied to the end of the double-clad fiber and electric discharge applied to the inner portion at 100 μm in the longitudinal direction from the end were intermittent discharge, where the discharge time and the non-discharge time were as shown in Table 2 and the ratio of the discharge time to the non-discharge time was as shown in Table 2, and that the electric discharge was repeated ten times.

Next, signal light was caused to propagate through the core of the double-clad fiber to the core of the single-mode fiber of each of Examples 6 to 10. The wavelength of the signal light was 1070 μm. The resulting splice loss of the signal light at the splice of the double-clad fiber and the single-mode fiber was as values shown in Table 2.

TABLE 2

|  | Discharge time (μs) | Non-Discharge time (μs) | Ratio (Discharge time:Non-dischrage time) | Splice Loss (dB) |
|---|---|---|---|---|
| Example 6 | 50 | 50 | 1:1 | 2.66 |
| Example 7 | 50 | 100 | 1:2 | 1.87 |
| Example 8 | 50 | 200 | 1:4 | 0.66 |
| Example 9 | 50 | 300 | 1:6 | 0.12 |
| Example 10 | 50 | 400 | 1:8 | 0.14 |

Examples 11 to 15

The double-clad fiber and the single-mode fiber were connected to each other in the same manner as Example 1 except that a double-clad fiber in which a clad has a septagonal shape with an average outer diameter of 400 μm was used, that electric discharge applied to the end of the double-clad fiber and electric discharge applied to the inner portion at 100 μm in the longitudinal direction from the end were intermittent discharge, where the discharge time and the non-discharge time were as shown in Table 3 and the ratio of the discharge time to the non-discharge time was as shown in Table 3, and that the electric discharge was repeated ten times.

Next, signal light was caused to propagate through the core of the double-clad fiber to the core of the single-mode fiber of each of Examples 11 to 15. The wavelength of the signal light was 1070 μm. The resulting splice loss of the signal light at the splice of the double-clad fiber and the single-mode fiber was as values shown in Table 3.

TABLE 3

|  | Discharge time (μs) | Non-Discharge time (μs) | Ratio (Discharge time:Non-dischrage time) | Splice Loss (dB) |
|---|---|---|---|---|
| Example 11 | 50 | 50 | 1:1 | 2.25 |
| Example 12 | 50 | 100 | 1:2 | 1.56 |
| Example 13 | 50 | 200 | 1:4 | 0.88 |
| Example 14 | 50 | 300 | 1:6 | 0.18 |
| Example 15 | 50 | 400 | 1:8 | 0.16 |

The results in Tables 2 and 3 show that the splice loss was less than 1 dB in Examples 8, 9 and 10 and Examples 13, 14 and 15, and particularly less than 0.2 dB in Examples 9 and 10 and Examples 14 and 15. Therefore, in intermittent discharge, it is preferable that the non-discharge time be four times or more longer than the discharge time, with which the double-clad fiber and the single-mode fiber are connected in a state where axial misalignment is suppressed regardless of the outer diameter of the clad of the optical fiber that is formed. It is further preferable that the non-discharge time be six times or more longer than the discharge time, with which the double-clad fiber and the single-mode fiber are connected in a state where axial misalignment is further suppressed.

INDUSTRIAL APPLICABILITY

According to the invention, a method for connecting optical fibers and a connection structure of optical fibers capable of suppressing axial misalignment between cores are provided.

| Description of Reference Numerals | |
|---|---|
| 1 | laser device |
| 10 | seed light source |
| 15 | fiber for propagation of seed light |
| 20 | pumping light source |
| 21 | laser diode |
| 22 | fiber for propagation of pumping light |
| 30 | amplification optical fiber |
| 31 | core |
| 32 | clad |
| 33 | plastic clad |
| 34 | coating layer |
| 40 | combiner |
| 50 | delivery fiber |
| 51 | core |
| 52 | clad |
| 53 | plastic clad |
| 54 | coating layer |
| 60 | splice point |
| S1 | preparing step |
| S2 | stripping step |
| S3 | forming step |
| S4 | aligning step |
| S5 | fusing step |

The invention claimed is:

1. A method for connecting optical fibers, comprising:
a preparing step of preparing a pair of optical fibers including a first optical fiber having a clad of a non-circular shape and a second optical fiber having a clad of a circular shape;
a forming step of forming the clad of the first optical fiber at and near one end thereof to have a more circular shape from the non-circular shape;
an aligning step of observing in side view a formed portion of the clad of the first optical fiber and around one end of the second optical fiber and aligning a core of the first optical fiber at and near the one end thereof and a core of the second optical fiber at and near the one end thereof in a straight line; and
a fusing step of butting the one end of the first optical fiber and the one end of the second optical fiber against each other and fusing the ends together.

2. A method for connecting optical fibers, comprising:
a preparing step of preparing a pair of optical fibers each having a clad of a non-circular shape;
a forming step of forming the clad of each of the optical fibers at and near one end thereof to have a more circular shape from the non-circular shape;
an aligning step of observing in side view formed portions of the clads of the optical fibers and aligning a core of one optical fiber at and near the one end thereof and a core of another optical fiber near the one end thereof in a straight line; and
a fusing step of butting the one ends of the optical fibers against each other and fusing the ends together.

3. The method for connecting optical fibers according to claim 1 or 2, wherein in the forming step, the clad is formed for 100 μm or longer in a longitudinal direction of the optical fiber from the one end thereof.

4. The method for connecting optical fibers according to any one of claim 1 or 2, wherein the forming in the forming step is carried out by discharge heating.

5. The method for connecting optical fibers according to claim 4, wherein the discharge heating is carried out by intermittent discharge.

6. The method for connecting optical fibers according to claim 5, wherein a non-discharge time is longer than a discharge time in the intermittent discharge.

7. The method for connecting optical fibers according to claim 6, wherein the non-discharge time is four times or more longer than the discharge time.

* * * * *